United States Patent [19]
Bonner et al.

[11] Patent Number: 5,842,182
[45] Date of Patent: Nov. 24, 1998

[54] TIME AND ATTENDANCE EVENT ANALYSIS AND REPORTING

[75] Inventors: Michael D. Bonner, Port Huron, Mich.; William M. Hartman, Morris Plains, N.J.

[73] Assignee: TimeTrak Systems, Inc., Port Huron, Mich.

[21] Appl. No.: 600,196

[22] Filed: Feb. 12, 1996

[51] Int. Cl.[6] .................................................. G06F 17/60
[52] U.S. Cl. .............................. 705/32; 705/11; 235/377
[58] Field of Search .................... 705/32, 11, 8, 705/9; 235/377

[56] References Cited

U.S. PATENT DOCUMENTS

| | | | |
|---|---|---|---|
| 4,011,434 | 3/1977 | Hockler | 235/377 |
| 4,270,043 | 5/1981 | Baxter et al. | 235/419 |
| 4,323,771 | 4/1982 | Chalker et al. | 235/377 |
| 4,409,657 | 10/1983 | Van der Lely | 705/32 |
| 4,413,277 | 11/1983 | Murray | 705/11 |
| 4,423,315 | 12/1983 | Kato et al. | 235/377 |
| 4,516,138 | 5/1985 | Iwasawa et al. | 235/377 |
| 4,524,266 | 6/1985 | Krakauer et al. | 235/377 |
| 4,764,120 | 8/1988 | Griffin et al. | 705/11 |
| 4,812,627 | 3/1989 | Wexler | 705/32 |
| 4,847,791 | 7/1989 | Martin et al. | 364/554 |
| 5,068,787 | 11/1991 | Pipella | 705/32 |
| 5,459,657 | 10/1995 | Wynn et al. | 705/32 |

OTHER PUBLICATIONS

Gardiner, Richard, Tracking and Controlling Absenteeism, Spring 1992, pp. 1–13.

*Primary Examiner*—Robert A. Weinhardt
*Assistant Examiner*—Raquel Alvarez
*Attorney, Agent, or Firm*—Barnes, Kisselle, Raisch, Choate, Whittemore & Hulbert

[57] ABSTRACT

A parameter-driven time-and-attendance analysis system that includes one or more data entry stations for entering user time and attendance data, and a central processor coupled to the data entry stations for receiving and evaluating the user time and attendance data. The central processor includes facility for identifying exception data indicative of non-standard time and attendance data, and for assigning event points to such exception data based upon character of the exception data. Such event points are accumulated for each system user, and a report is automatically generated when accumulated event points for a system user reach a preselected level.

17 Claims, 9 Drawing Sheets

Microfiche Appendix Included
(2 Microfiche, 174 Pages)

Event Rules Maintenance

OPTIONS

Change
List
Add
Delete

Event Code: LT    LOST TIME
Event Type: Employee
Trans Type: Exception
Trans Code: LA    Late Arrive
Reason Code: UEX    UNEXCUSED
Cost Center: All
Department: All
Job Class: All
Shift: All
Conversion: Minutes
Occurence Type: N/A
Pay Period: N/A
Period Count: N/A

| Trans. Quantity | Points per Day Assignments ||||||||
|---|---|---|---|---|---|---|---|---|
| | All | Sun | Mon | Tue | Wed | Thr | Fri | Sat |
| 10.00 | 0.50 | 0.00 | 0.00 | 0.00 | 0.00 | 0.00 | 0.00 | 0.00 |
| 30.00 | 1.00 | 0.00 | 0.00 | 0.00 | 0.00 | 0.00 | 0.00 | 0.00 |
| 60.00 | 1.50 | 0.00 | 0.00 | 0.00 | 0.00 | 0.00 | 0.00 | 0.00 |

Edit
Save

FIG. 4A

```
                    Event Rules Maintenance

OPTIONS
```

| Change |
|--------|
| List   |
| Add    |
| Delete |

```
      Event Code:  LT    LOST TIME
      Event Type:  Employee
      Trans Type:  Exception
      Trans Code:  A     ABSENCE
     Reason Code:  EX    EXCUSED
     Cost Center:  All
      Department:  All
       Job Class:  All
           Shift:  All
      Conversion:  Occurrence
  Occurence Type:  Consecutive
      Pay Period:  HW
    Period Count:  2
```

| Trans.<br>Quantity | | | Points per Day Assignments | | | | | |
|---|---|---|---|---|---|---|---|---|
| | All | Sun | Mon | Tue | Wed | Thr | Fri | Sat |
| ---------- | ----- | ----- | ----- | ----- | ------ | ----- | ----- | ----- |
| 1.00 | 1.00 | 0.00 | 0.00 | 0.00 | 0.00 | 0.00 | 0.00 | 0.00 |

```
                                              Edit
                                              Save
```

Action Rules Maintenance

OPTIONS

Change
List
Add
Delete

Action Code Rules

Code .........Description.......................
  Lt1   Warning Letter Level 1
  Type:       Employee
  Executable: Yes
  Max Occurs: 999

..................Period Parameters......
  Type:       Pay Period
  Count:      2
  From:       Current Period End
  Pay Rules:  HW
  Begin Date: N/A
  End Date:   N/A .............Point Parameters..............
  Event Basis:  Conditional And Affiliated Event Codes

| Code | Evaluation | Point Value |
| --- | --- | --- |
| LT | Greater Than or Equal | 5.00 |

FIG. 6

TIME AND ATTENDANCE EVENT ANALYSIS AND REPORTING

The present invention is directed to time and attendance systems, and more particularly to a system and method for parameter-driven analysis of time and attendance data.

A portion of the disclosure of this patent document contains material that is subject to copyright protection. The copyright owner has no objection to facsimile reproduction by anyone of the patent document or the patent disclosure, as it appears in the Patent and Trademark Office patent files or records, but otherwise reserves all copyright rights whatsoever.

Reference is made to a microfiche Appendix that accompanies this application, consisting of two sheets of fiche containing one hundred seventy-four frames.

BACKGROUND AND SUMMARY OF THE INVENTION

Many organizations currently employ automated systems for tracking employee time and attendance, and automatically generating payroll information. The time and attendance data entered into the system for payroll computation purposes inherently includes information indicative of potential disciplinary problems, such as unexcused late arrivals or absences. However, such data must currently be analyzed manually for individual employees, and consequently is often not timely analyzed or is completely ignored. It is therefore a general object of the present invention to provide a system and method for automatically analyzing and accumulating non-standard time and attendance data, such as data indicative of late arrivals or absences, and automatically reporting when such non-standard data warrants action.

A parameter-driven time-and-attendance analysis system in accordance with the present invention includes one or more data entry stations for entering user time and attendance data, and a central processor coupled to the data entry stations for receiving and evaluating the user time and attendance data. The central processor includes facility for identifying exception data indicative of non-standard time and attendance data, and for assigning event points to such exception data based upon character of the exception data. Such event points are accumulated for each system user, and a report is automatically generated when accumulated event points for a system user reach a preselected level. For example, the central processor in accordance with the disclosed embodiment of the invention identifies exception data indicative of late arrivals or absences, and assigns event points depending upon whether the absence is excused or unexcused and lateness of the arrival. These event points are accumulated over a predetermined time duration, such as a pay period or other time duration, and a disciplinary report is automatically generated in the event that the event points reach a preselected level within the accumulation period.

The system according to the preferred embodiment of the invention includes facility for specifying differing types of non-standard time-and-attendance data, and for selectively assigning differing numbers of event points to such data based upon data type. The system also includes facility for selectively varying the report threshold level of the event points as a function of data type, and for the time period over which event points are accumulated. Action to be taken in the event that the accumulated number event points reach the preselected level within the applicable time period is also selectable by a system operator, and may include for example reporting the situation to management or automatically generating a disciplinary warning or discharge letter to the system user.

In accordance with another aspect of the present invention, there is provided a method of analyzing and report employee time and attendance data. (It will be appreciated, of course, that the term "employee" is to be read in the broad or generic sense to encompass all persons or users required to enter time and attendance information into the system.) The method includes the steps of identifying exception data within the time and attendance data indicative of employee late arrival or absence, and assigning event points to such exception data. The event points are accumulated separately for each employee and compared to a preselected threshold level. A disciplinary report for the employee is automatically generated when the associated accumulated event points reach the preselected threshold level. In the preferred system and method of the invention, event points are assignable as a function of day of the week on which the late arrival or absence occurs, whether an absence is excused or unexcused, and quantity of time that the employee is late.

The system and method of the present invention may be used in many ways to analyze time and attendance data. For example, a union contract may specify that an employee is to receive a written warning when he or she has been late more than two times within a six-month period, a second and final warning with a two-day suspension when he or she has been late three times during a six-month period, and terminated upon occurrence of a fourth late arrival within a six-month period. Through implementation of the present invention, each stage is automatically tracked in real time, and the appropriate warning or termination letter is automatically generated. In another example, a company may bid a job to supply services and manpower based upon anticipated time required to complete an assignment. A key to success of such an organization is to manage carefully the hours spent providing the contract services versus the original estimate to complete the assignment. The system and method of the present invention can automatically notify the organization when various levels of time have been reached on a particular job, which can help to assess overall performance and profitability.

The system and method of the present invention may also be employed to benefit or reward employees, for example in the absence of late arrivals or absences over a given time period. The system and method of the invention may be employed to analyze and report time and attendance data, for example to report absences for all or a selected group of employees on Mondays. Non-standard data can be assigned and tracked by a descriptive field, such as data giving a reason for a late arrival or absence.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
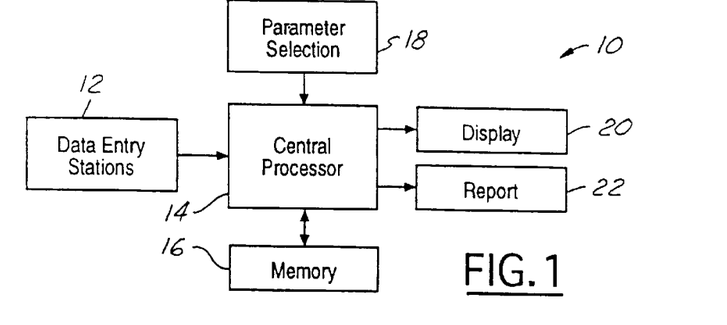
FIG. 1 is a functional block diagram of a parameter-driven time-and-attendance analysis and reporting system in accordance with a presently preferred embodiment of the invention.

FIG. 1 illustrates a system 10 in accordance with a presently preferred embodiment of the invention as comprising one or more data entry stations 12 that provide time-and-attendance data inputs to a central processing unit 14. Data entry stations 12 may be of any suitable conventional type, such as time card readers, automated employee badge-reading terminals, telephones, fixed or portable data collection units, keyboards, etc. Data entry stations 12 can supply any suitable type of data information to central processor 14. Key data for implementation of the present invention generally includes employee i.d. and time of entry or exit. Other data may include gate of entry, area of entry, etc. Central processor 14 is connected to a memory module 16 (which may be within or separate from processor 14) for storing time-and-attendance data and analysis parameters in memory, and retrieving such information for analysis. Processor 14 also receives input from a parameter selection module 18, which would typically comprise a central system operator keyboard or the like. Processor 14 provides output to a display 20 for selective display of collected data, and/or to a printer or the like for generating employee time-and-attendance reports 22.

Figure 2:
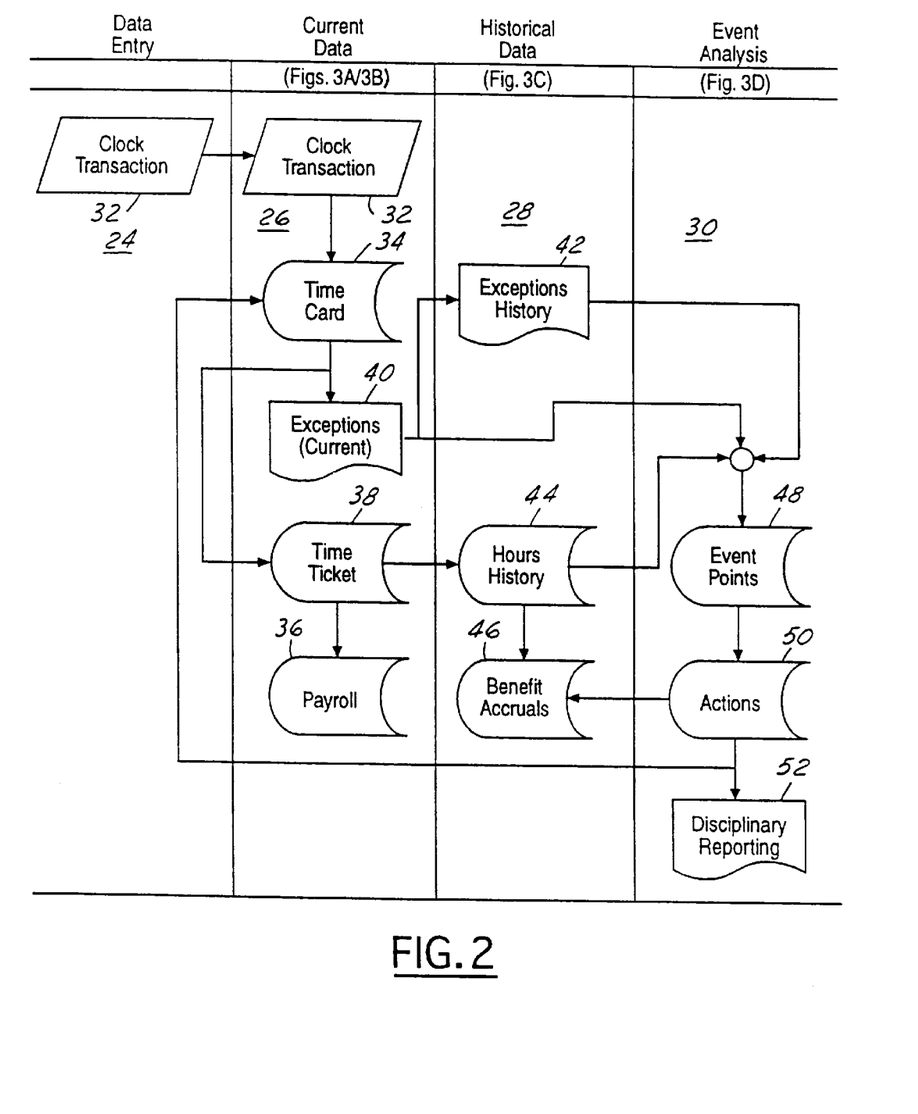
FIG. 2 is an overall flowchart that illustrates operation of the preferred embodiment of the invention.

FIG. 2 is a flowchart of overall data flow in accordance with the system and method of the present invention. Clock transaction data 32 is generated in a data entry module 24 by operation of data entry stations 12 (FIG. 1). This clock transaction data 32 is fed to a current data analysis module 26, which processes the raw clock transaction data, accumulates clock transaction and time card data for one pay period, and converts it into summary data 34 for payroll 36, time ticket hours summary 38 and generation of exception data 40. Payroll data 36 provides information to pay the employee based upon current time-and-attendance data. Exception data 40 indicates non-standard or unexpected activity, such as late arrivals, early exits or absences, all whether excused or unexcused. This current data is then fed to a historical data analysis module 28 in which exceptions are stored at 42 in memory for purposes of analysis over preselected periods, such as pay periods or calendar periods such as weeks, months or years. The historical data module 28 also accumulates at 44 hours history of time ticket data from previous periods, and accrues benefit information 46 based upon both hours history and disciplinary actions. Data entry module 24, current data module 26 and historical data module 28 all represent current technology. In the presently preferred implementation of the present invention, current data analysis module 26 and historical data analysis module 28 comprise packages marketed by applicant's assignee under the trademarks TIMETRAK and HISTRAK respectively. Data entry stations 12 may comprise any suitable devices, as described above, marketed by applicant's assignee or others.

The present invention deals primarily with an event analysis module 30 (FIG. 2), both alone and as interacting with current data and historical data analysis modules 26, 28. In event analysis module 30, event points are tallied at 48 according to pre-assigned or pre-selected rules from exception data 40, 42 generated within historical data module 28 or current data module 26, and from hours history data 44 generated in historical data module 28. As will be discussed in greater detail hereinafter, event points are assigned for exceptions such as unexcused absences or late arrivals. Upon accumulation of a preselected number of such event points, one or more actions 50 are initiated in event analysis module 30, such as updating benefit accrual and time card data, or generating disciplinary reports or warning letters 52 to the employee.

Figure 3A:
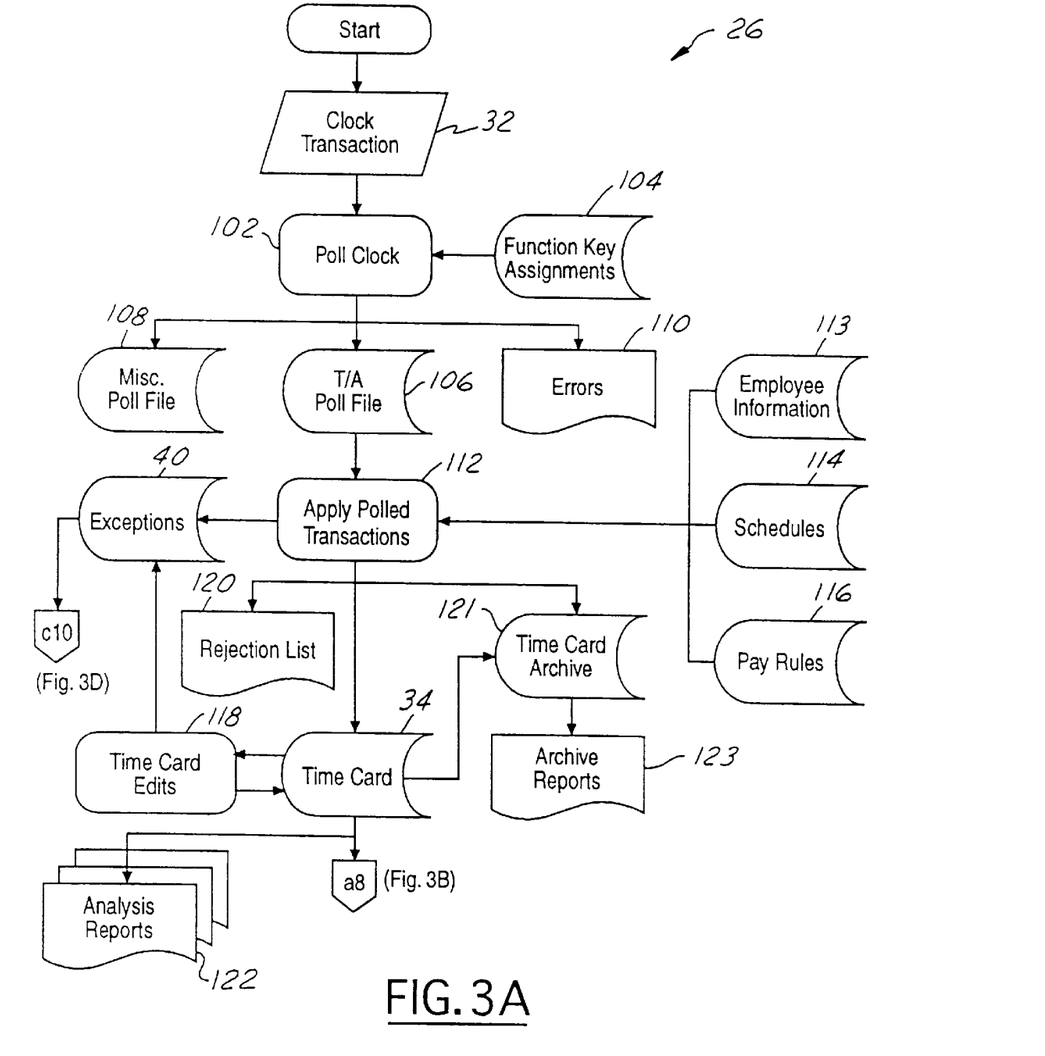
FIGS. 3A, 3B, 3C and 3D together comprise a more detailed flowchart that illustrates operation of the preferred embodiment of the invention.
Figure 3B:
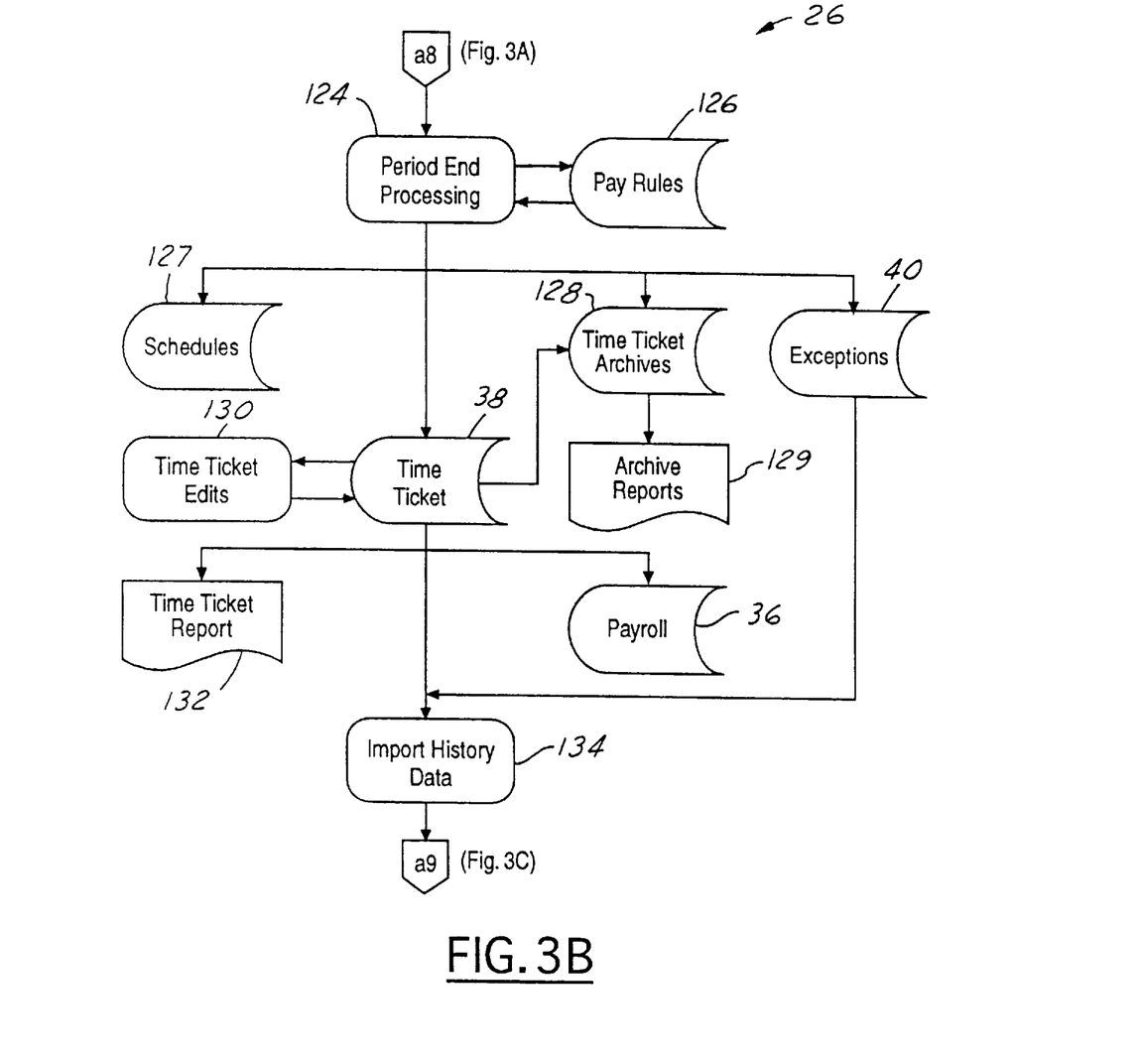

FIGS. 3A and 3B together illustrate operation of current data analysis module 26 in greater detail. The process begins with the recording of transactions 32 captured at the clock. These transactions contain a variety of information, including the time and date of the transaction, an identification number, and the additional data relevant to the intent of the transaction. Transactions are accumulated in the clock until the host system initiates a poll 102 of the clock. As the transactions are brought into the time and attendance system, they are evaluated for content based upon a set of parameters defined in the function key assignments 104. The function key assignments provide the initial filtering device for discerning the intent of the transaction. Upon this determination, the transaction may go to a time and attendance poll file 106, a miscellaneous poll file 108, or it may be rejected at 110. Transactions going to time and attendance poll file 106 are again evaluated at 112 for content, processed against information from an employee's data record 113, an employee's schedule 114, and pay rules 116 that govern the application of time calculations as related to the employee. The process 112 of applying polled transactions adds time and attendance data to the employee's time card file 34 (FIGS. 2 and 3A). Transactions going to employee's time card 34 that deviate from what is expected generate exception transactions 40 (FIGS. 2 and 3A), which may be subsequently updated from time card edits 118. Polled transactions deemed to be invalid are indicated on a rejection list 120. This process of adding transactions to time card 34 also produces an audit trail by writing to a time card archive 121. Information contained in time card 34 is then available to a variety of analysis reporting options 122. Archive 121 is available for reporting 123.

Upon completion of the accumulating and editing of current period data (FIG. 3A), period end processing 124 (FIG. 3B) is initiated. This process translates the current period's data, for all employees governed by the specified pay rules 126, into a time ticket file 38 (FIGS. 2 and 3B). Period end processing updates the employee's schedules 127, and it updates the summary file 40 (FIGS. 2, 3A and 3B) of all exception data that occurred in the current period. The process of adding transactions to time ticket 38 also produces an audit trail by writing to time ticket archives 128. Archives 128 are available for reporting at 129. Final editing 130 of the employee's time and attendance data occurs in time ticket 38, and may be reported via a time ticket report 132. Information contained in the time ticket is then provided to payroll 36 (FIGS. 2 and 3B), and a summary of hours and/or dollars transactions and exception data is archived to module 28 (FIGS. 2 and 3C) through import history data process 134.

Figure 3C:
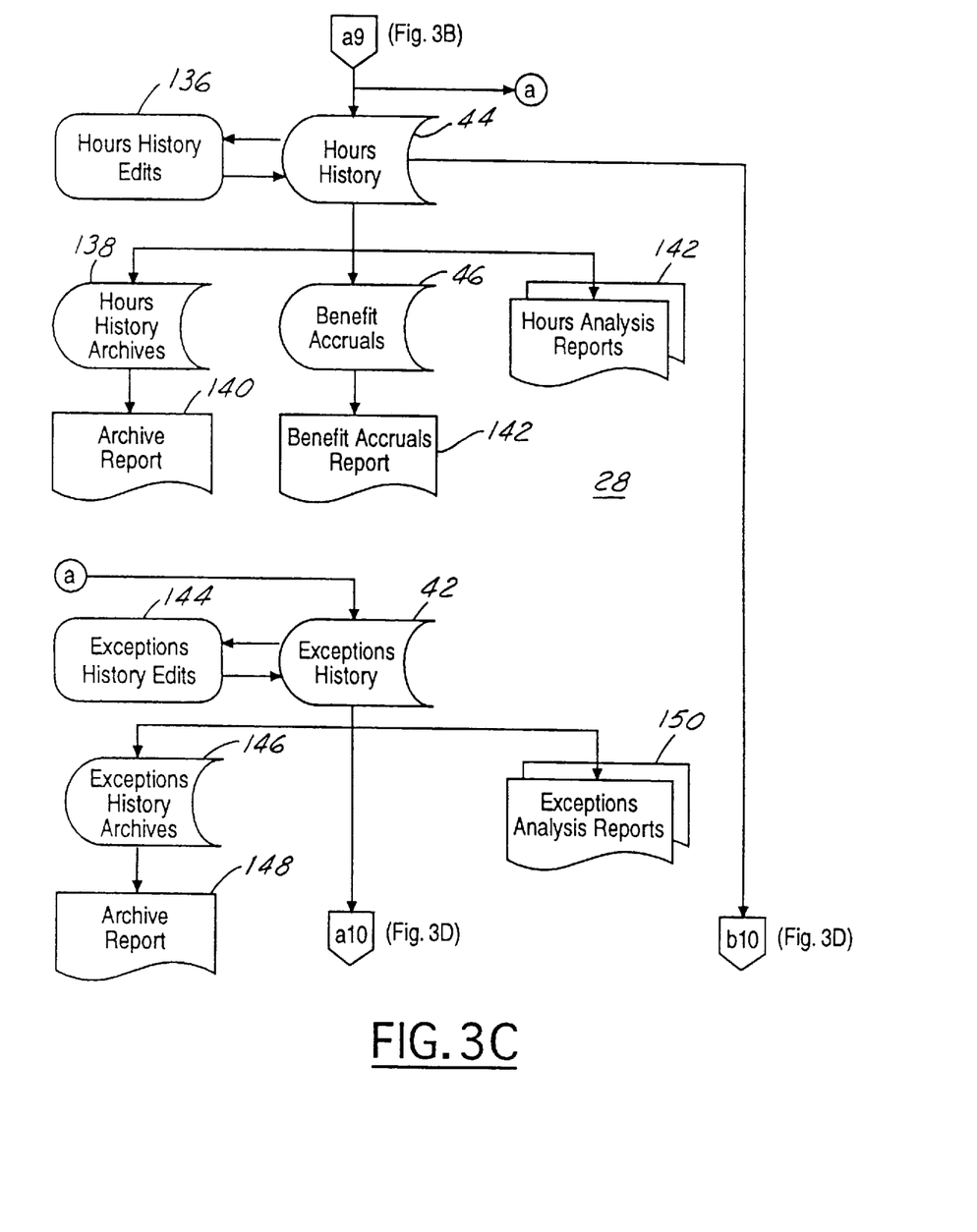

FIG. 3C illustrates operation of historical data module 28 in greater detail. Hours history transactions 44 (FIGS. 2 and 3C) are again made available for edit 136, with modifications being logged to the hours history archives 138. Archiving activity is accessible for reporting 140. Information contained in hours history file 44 is available for a variety of analysis reporting options 142, and is used as a basis for calculating the available benefit time accruals 46 (FIGS. 2 and 3C). Benefit accrual time usage and availability 46 is also accessible for report 142. Exceptions history transactions 42 (FIGS. 2 and 3C) are made available for edit 144, with modifications being logged to the exceptions history archives 146. Archiving activity is accessible for reporting 148. Information contained in exceptions history file 42 is available for a variety of analysis reporting options 150.

Figure 3D:
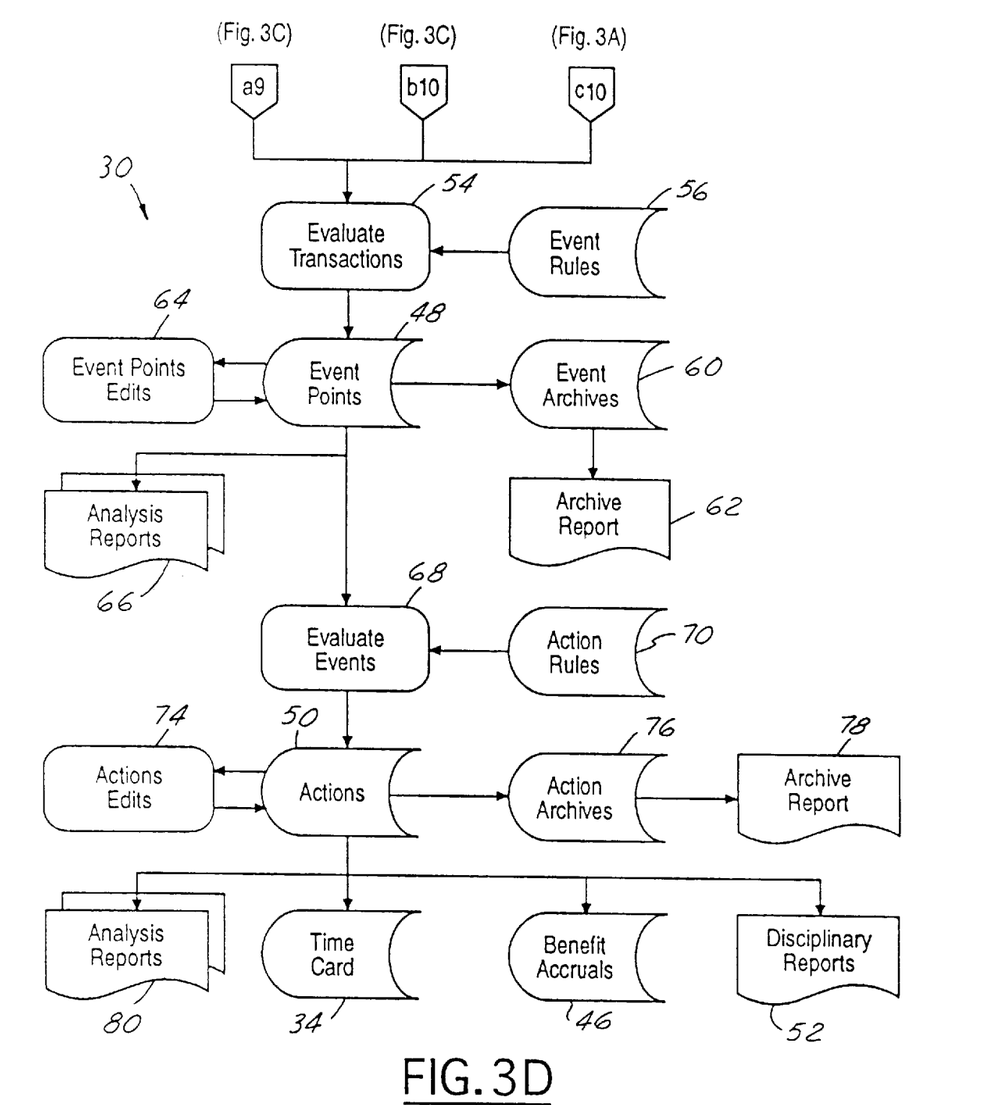

FIG. 3D illustrates operation of event analysis module 30. As shown in both FIG. 2 and FIGS. 3A–3D, event analysis module 30 is entered from exceptions history data 42 in historical data module 28 (FIGS. 2 and 3C), hours history data 44 in historical data module 28 (FIGS. 2 and 3C), and exceptions data 40 in current data module 26 (FIGS. 2 and 3A). This entry data in FIG. 3D is evaluated at 54 according to pre-assigned event rules 56 (as will be explained in connection with FIGS. 4A and 4B), and event points 48 (FIGS. 2 and 3D) are assigned. These event points are stored at 60 in archival memory 16 (FIG. 1) for future generation of archival reports 62 as desired. Event point data 48 may be edited at 64 by a system operator, and employed for generation of analysis reports 66. The current and historical event data is analyzed or evaluated at 68 according to preselected event action rules 70 (as will be discussed in connection with FIG. 6) for initiation of appropriate actions 50 (FIGS. 2 and 3D). These actions are subject to system operator editing 74 as appropriate, and are stored at 76 in archival memory 16 (FIG. 1) for later archival reporting 78 as desired. Edited action data may be employed for analysis reports 80, for updating time card data 34 (FIGS. 2, 3A and 3D), for updating of accrued benefit information 46 (FIGS. 2, 3C and 3D) and for generation of appropriate disciplinary reports 80 such as warning letters to the employee.

As noted above, event analysis module 30 (FIGS. 2 and 3D) functions to interpret current and historical data that comprise an employee's record, and to translate this data into a vehicle for user-definable action. These actions are produced as a result of a two-stage evaluation process (at 54 and 68 in FIG. 3D) of the employee's current and historical data. That is, the employee's current and historical data is analyzed based upon a user-defined set of rules 56, 70, which dictate whether or not specific data meet the criteria that creates an event transaction. When the current data is found to accrue an event transaction, an event transaction is created and a specific point value is assigned to that event. These event point transactions are a means of grouping together a variety of current and/or historical data transactions, and assigning a point value to the sum of these transactions. As the event points are accumulated, the event analysis module determines whether presence or absence of event points occurring within a specified time frame indicates that some sort of action is to occur.

Figure 4A:
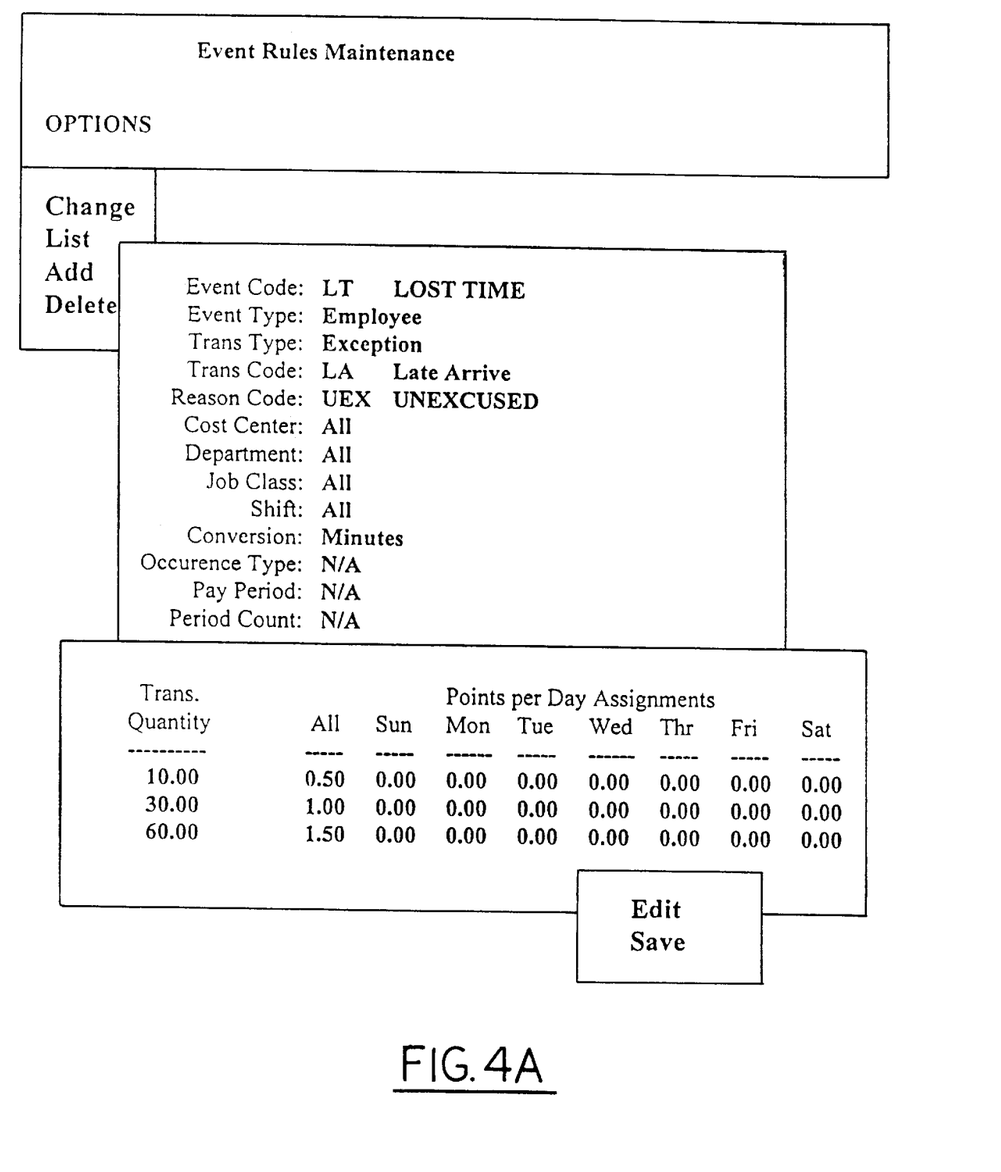
FIGS. 4A and 4B illustrate two screens for operator setting of event points in accordance with the preferred embodiment of the invention.
Figure 4B:
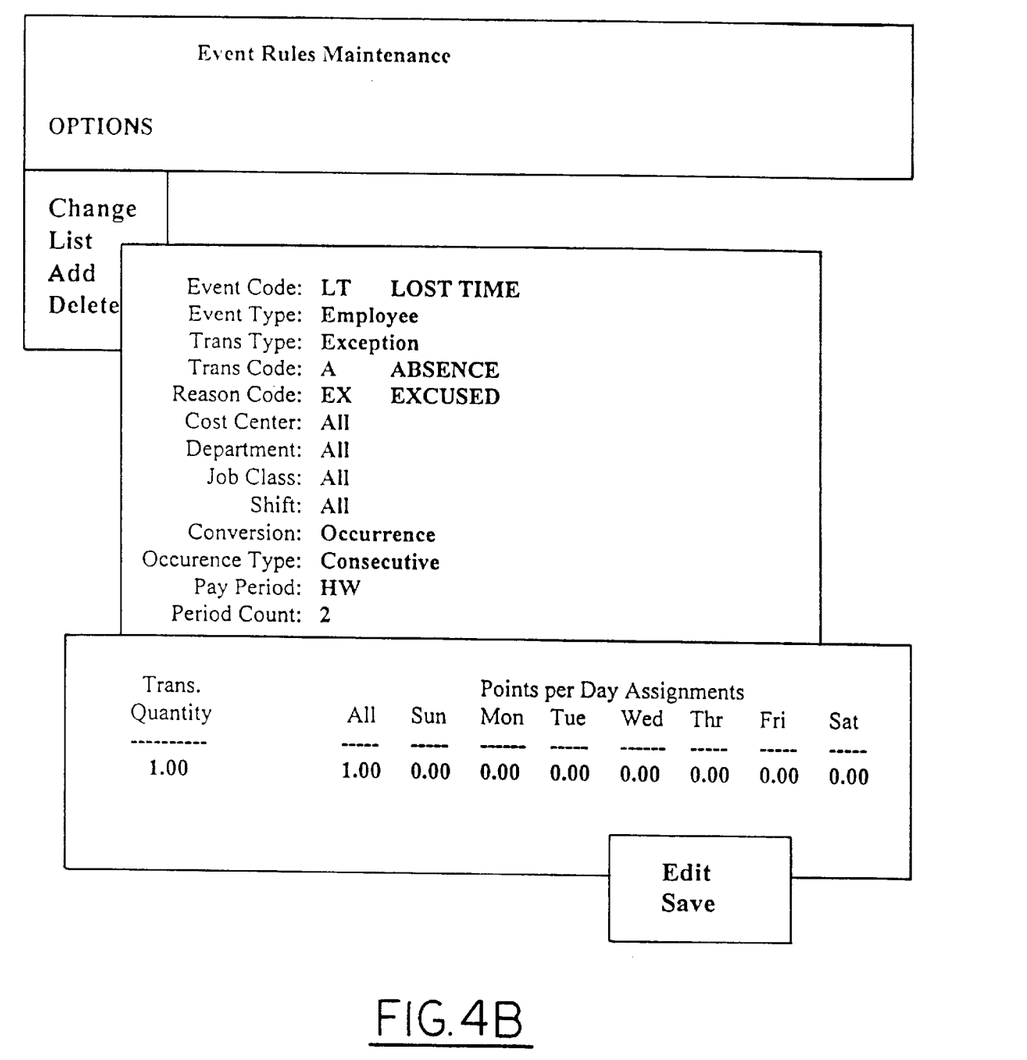

Assignment of event rules, which represent the parameters of how historical and current data is to be evaluated and translated into a transaction with a point value, are illustrated in FIGS. 4A and 4B. FIGS. 4A and 4B illustrates windows generated on an operator screen for selection of event points to be assigned to a particular type of transaction, in these cases unexcused late arrival by an employee (FIG. 4A) or an excused absence such as for vacation or personal time (FIG. 4B). In FIG. 4A, an event code LT is assigned to the overall type of event involved—i.e., lost time due to either a late arrival or early departure. The event type is an employee event type, as distinguished from a company event, and the transaction type is an exception in the sense of representing non-standard data. The transaction code LA indicates a late arrival having an UEX or unexcused reason code. All of this data, plus cost center, department job class and shift data, are generated in current data module 26 (FIGS. 2 and 3A). Of particular interest relative to the event analysis module 30 are the units of conversion, in this case minutes, and occurrence type, pay period and period count, which in this case are programmed as being not applicable. Event points are assigned according to preselection by the system operator, in this case based upon time late and day of the week. The illustration of FIG. 4A indicates that the system operator has programmed the system for assignment of 0.5 event points for an unexcused late arrival of ten to twenty-nine minutes, 1.0 point for an unexcused late arrival of thirty to fifty-nine minutes, and 1.5 points for a late arrival of sixty minutes or more on any day of the week. An unexcused late arrival of nine minutes or less does not accumulate event points in this particular example. In the same way, the windows screen illustration of FIG. 4B shows assignment of 1.0 points upon each occurrence of an excused absence on any day of the week. Consecutive absences within a two-week pay period HW are treated as a single occurrence.

Figure 5:
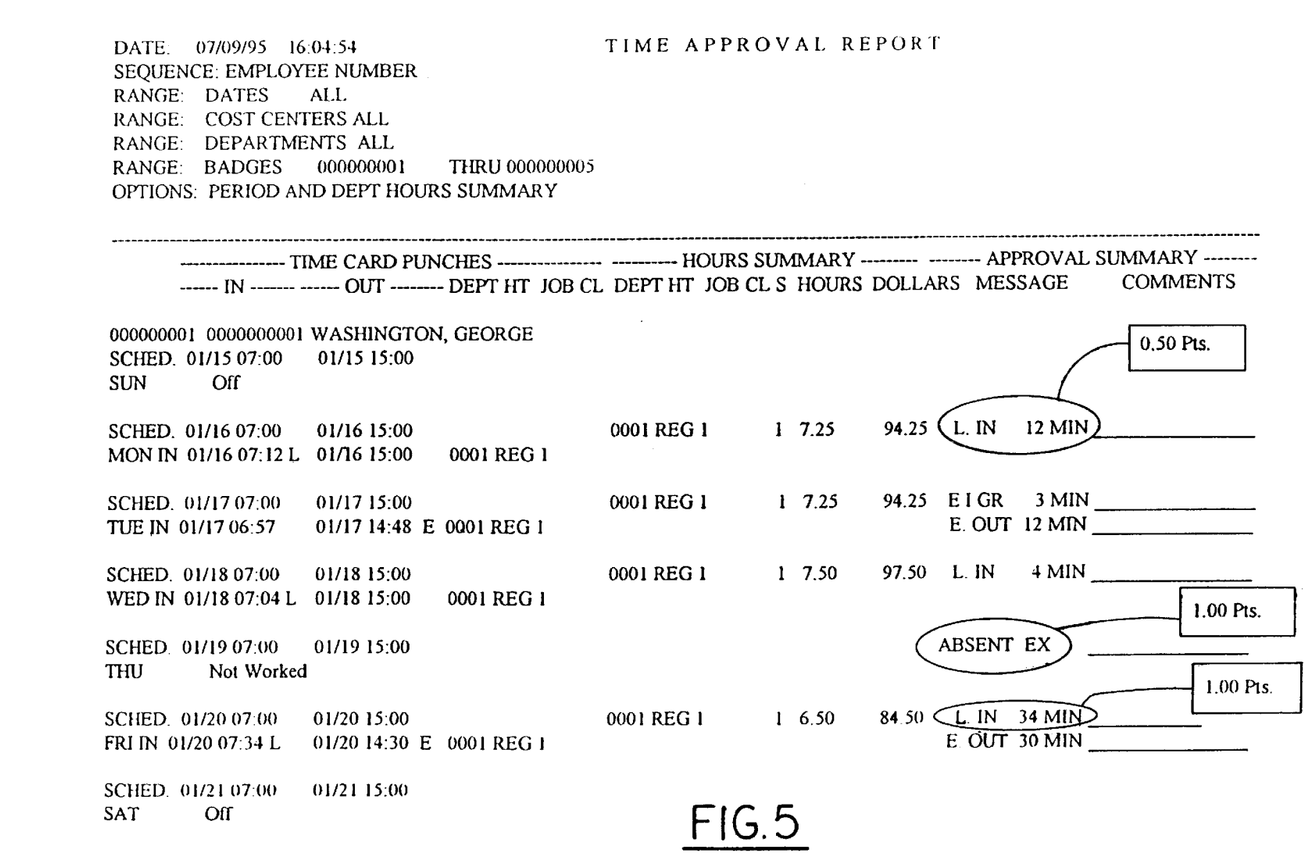
FIG. 5 illustrates a time approval report generated in the preferred embodiment of the invention.

FIG. 5 illustrates an analysis report (80 in FIG. 3D) generated for management approval. This exemplary report illustrates a late arrival on Monday of twelve minutes, which generates 0.5 event points in accordance with the event point rules illustrated in FIG. 4A. On Tuesday, there is an indication that the employee left on lunch break three minutes early, and left the workplace twelve minutes early, neither of which generates event points. On Wednesday, the employee was four minutes late arriving at work, which again generates no event points in accordance with the preselected rules illustrated in FIG. 4A. On Thursday, there is an excused absence, which generates one even point in accordance with the illustration of FIG. 4B. On Friday, the employee was thirty-four minutes late, again generating one event point in accordance with the rules of FIG. 4A, while the early departure of thirty minutes generates no event points. Thus, the report of FIG. 5 indicates that, for this particular employee, 2.5 event points were accumulated over a one-week period.

Figure 6:
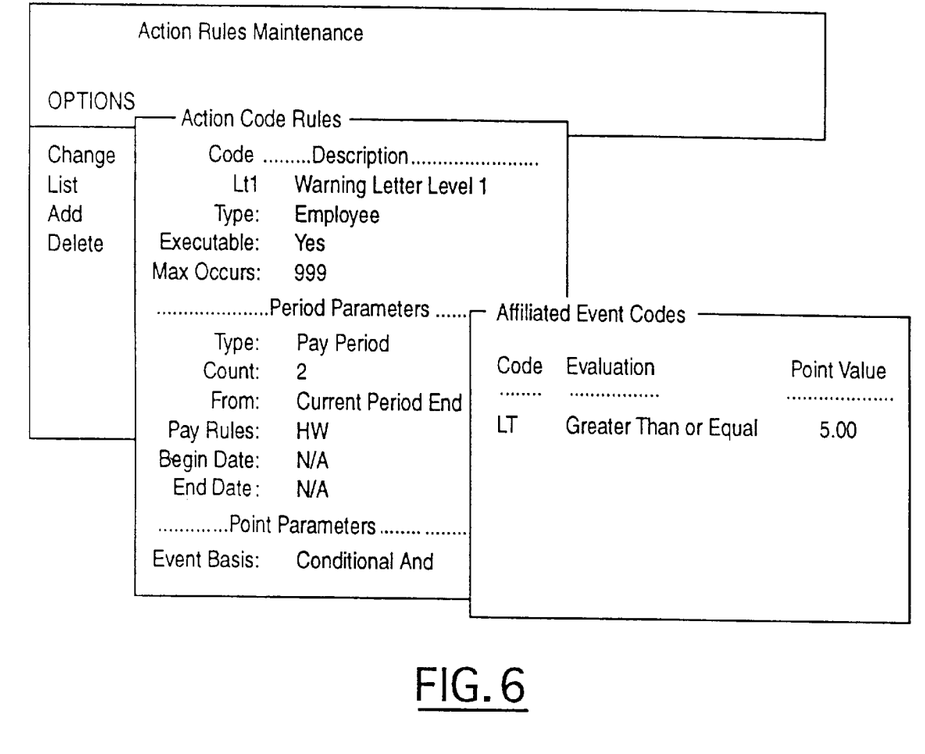
FIG. 6 illustrates a screen for system operator selection of action to be taken in the event of excessive accumulated event points in the preferred embodiment of the invention.

FIG. 6 illustrates system operator programming of rules of actions to be taken upon accumulation of event points. In particular, FIG. 6 illustrates a windows screen for assigning action to be taken, in this case generation of a level one warning letter to the employee upon accumulation of 5.0 or more late arrival (LT) event points over two pay periods. For example, if the employees were paid in two-week periods, the action rules selected in FIG. 6 would call for automatic generation of a level-one warning letter to the employee upon occurrence of five or more late arrival event points over a four-week period beginning at the onset of a pay period and ending with the end of the next consecutive pay period.

Presently preferred packages for current data module 26 and historical data module 28 are marketed by applicants' assignee under the registered trademarks TIMETRAK and HISTRAK respectively. Other suitable packages are marketed by a number of other parties. The microfiche Appendix that accompanies this application shows the detailed programming flowcharts in implementation of event analysis module 30 in its currently preferred embodiment.

We claim:

1. A parameter-driven time and attendance analysis system that comprises:

data entry means for entry of user time and attendance data, means coupled to said data entry means for receiving and evaluating said time and attendance data, including means for identifying exception data indicative of non-standard time and attendance data and means for assigning event points to said exception data based upon character of said exception data, means for accumulating said event points for each system user, and means for automatically reporting when accumulated event points for a system user reach a preselected level, said means for assigning event points to said exception data comprising means for specifying differing types of non-standard time and attendance data, and means for selectively assigning differing event points to such non-standard data based upon data type.

2. The system set forth in claim 1 wherein said means for accumulating event points includes means for accumulating event points separately for each specified type of non-standard data and for each system user.

3. The system set forth in claim 2 wherein said automatically reporting means includes means for operator setting of said preselected level.

4. The system set forth in claim 3 wherein said operator setting means includes means for selectively setting said preselected level at differing levels for differing types of said non-standard data.

5. The system set forth in claim 4 wherein said operator setting means further includes means for operator selection of time periods under which event points are accumulated in said accumulating means.

6. The system set forth in claim 4 wherein said automatically reporting means comprises means for operator selection of action to be taken when accumulated event points reach said preselected level, and means for automatically initiating such action when said accumulated event points reach said preselected level.

7. The system set forth in claim 1 wherein said automatically reporting means comprises means for operator selection of action to be taken when accumulated event points reach said preselected level, and means for automatically initiating such action when said accumulated event points reach said preselected level.

8. The system set forth in claim 1 wherein said automatically reporting means includes means for operator setting of said preselected level.

9. The system set forth in claim 8 wherein said means for assigning event points to said exception data comprises means for specifying differing types of non-standard time-and-attendance data, and means for selectively assigning differing event points to such non-standard data based upon data type.

10. The system set forth in claim 9 wherein said means for accumulating event points includes means for accumulating event points separately for each specified type of non-standard data and for each system user.

11. The system set forth in claim 10 wherein said operator setting means includes means for selectively setting said preselected level at differing levels for differing types of said non-standard data.

12. A method of analyzing and reporting employee time and attendance data that comprises the steps of:

(a) identifying exception data within said time and attendance data indicative of employee late arrival or absence, (b) selectively assigning event points to said exception data as a function of day of the week on what said late arrival or absence occurs, (c) accumulating event points separately for each employee, (d) comparing accumulated event points for each employee to a preselected level, and (e) generating a disciplinary report for the employee when the associated accumulated event points reach said preselected level.

13. The method as set forth in claim 12 wherein said step (b) comprises the step of selectively assigning said event points for an employee absence as a function of whether such absence is excused or unexcused.

14. The method as set forth in claim 12 wherein said step (b) comprises the step of selectively assigning said event points as a function of quantity of time that the employee is late.

15. A parameter-driven time and attendance analysis system that comprises:

data entry means for entry of user time and attendance data, means coupled to said data entry means for receiving and evaluating said time and attendance data, including means for identifying exception data indicative of non-standard time and attendance data and means for assigning event points to said exception data based upon character of said exception data, means for accumulating said event points for each system user, and means for automatically reporting when accumulated event points for a system user reach a preselected level, including means for operator setting of said preselected level, said means for assigning event points to said exception data comprising means for specifying differing types of non-standard time and attendance data, and means for selectively assigning differing event points to such non-standard data based upon data type.

16. A method of analyzing and reporting employee time and attendance data that comprises the steps of:

(a) identifying exception data within said time and attendance data indicative of employee late arrival or absence, (b) selectively assigning event points to said exception data for an employee absence as a function of whether such absence is excused or unexcused, (c) accumulating event points separately for each employee, (d) comparing accumulated event points for each employee to a preselected level, and (e) generating a disciplinary report for the employee when the associated accumulated event points reach said preselected level.

17. A method of analyzing and reporting employee time and attendance data that comprises the steps of:

(a) identifying exception data within said time and attendance data indicative of employee late arrival or absence, (b) selectively assigning event points to said exception data as a function of quantity of time that the employee is late, (c) accumulating event points separately for each employee, (d) comparing accumulated event points for each employee to a preselected level, and (e) generating a disciplinary report for the employee when the associated accumulated event points reach said preselected level.

* * * * *